(12) United States Patent
Akaha

(10) Patent No.: US 10,293,480 B2
(45) Date of Patent: *May 21, 2019

(54) ROBOT SYSTEM

(71) Applicant: Seiko Epson Corporation, Tokyo (JP)

(72) Inventor: Kazushige Akaha, Azumino (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,965

(22) Filed: Aug. 22, 2018

(65) Prior Publication Data

US 2018/0361567 A1    Dec. 20, 2018

Related U.S. Application Data

(63) Continuation of application No. 15/079,487, filed on Mar. 24, 2016, now Pat. No. 10,137,568.

(30) Foreign Application Priority Data

Mar. 31, 2015 (JP) ................................. 2015-071202

(51) Int. Cl.
*B25J 9/00* (2006.01)
*B25J 9/04* (2006.01)
*B25J 5/02* (2006.01)

(52) U.S. Cl.
CPC ............. *B25J 9/0018* (2013.01); *B25J 5/02* (2013.01); *B25J 9/046* (2013.01); *Y10S 901/49* (2013.01)

(58) Field of Classification Search
CPC ............................. B25J 15/0028; B25J 21/00
See application file for complete search history.

(56) References Cited

U.S. PATENT DOCUMENTS

| 4,894,855 A | 1/1990 | Kresse |
| 9,037,293 B2 | 5/2015 | Gomi et al. |
| 2003/0221504 A1 | 12/2003 | Stoianovici et al. |
| 2008/0086237 A1 | 4/2008 | Rebstock |
| 2013/0055560 A1 | 3/2013 | Nakasugi et al. |
| 2014/0277713 A1 | 9/2014 | Kouno et al. |

FOREIGN PATENT DOCUMENTS

| JP | 59-232779 A | 12/1984 |
| JP | S61-152380 A | 7/1986 |
| JP | 09-141592 A | 6/1997 |
| JP | 2011-240443 A | 12/2011 |
| JP | 2013-099801 A | 5/2013 |
| JP | 2014-046401 A | 3/2014 |
| WO | WO-2003-051575 A1 | 6/2003 |

OTHER PUBLICATIONS

BMI Gaming webpage (Sep. 2, 2013) (Year: 2013).

*Primary Examiner* — Ronald P Jarrett
(74) *Attorney, Agent, or Firm* — Harness, Dickey & Pierce, P.L.C.

(57) ABSTRACT

A robot system includes: a cell; and a robot which is provided to move in the cell, in which the robot includes an n-th (n is an integer which is equal to or greater than 1) arm which rotates around an n-th rotating axis, and an (n+1)th arm which is provided to rotate around an (n+1)th rotating axis which is an axial direction different from an axial direction of the n-th rotating axis, in the n-th arm, in which the length of the n-th arm is longer than the length of the (n+1)th arm, and in which, when viewed from the (n+1)th rotating axis, the n-th arm and the (n+1)th arm overlap each other.

9 Claims, 14 Drawing Sheets

ROBOT SYSTEM

CROSS-REFERENCE TO RELATED APPLICATIONS

This application is a continuation of U.S. patent application Ser. No. 15/079,487, filed on Mar. 24, 2016, which claims priority to Japanese Patent Application No. 2015-071202, filed on Mar. 31, 2015. The entire disclosures of both of the above applications are hereby expressly incorporated by reference herein.

BACKGROUND

1. Technical Field

The present invention relates to a robot system.

2. Related Art

In the related art, a robot provided with a robot arm is known. In the case of the robot arm, a plurality of arms (arm members) are linked to each other via a joint portion, and, for example, a hand is mounted on the arm furthest on the tip end side (the most downstream side) as an end effector. The joint portion is driven by a motor, and the arm rotates by the driving of the joint portion. In addition, the robot grabs an object by the hand, moves the object to a predetermined position, and performs predetermined work, such as assembly.

As such a robot, in JP-A-2014-46401, a vertical articulated robot is disclosed. The robot described in JP-A-2014-46401 is configured to perform an operation of moving a hand with respect to a base to a position different by 180° around a first rotating axis that is a rotating axis (rotating axis that extends in a vertical direction) furthest on the base end side (most upstream side), by rotating a first arm which is the arm furthest on the base end side with respect to the base around the first rotating axis.

In the robot described in JP-A-2014-46401, when moving the hand with respect to the base to a position different by 180° around the first rotating axis, a large space for preventing interference of the robot is necessary.

SUMMARY

An advantage of some aspects of the invention is to solve at least a part of the problems described above, and the invention can be implemented as the following forms or application examples.

Application Example 1

A robot system according to an aspect of the invention includes: a cell; and a robot which is provided to move in the cell, in which the robot includes an n-th (n is an integer which is equal to or greater than 1) arm which rotates around an n-th rotating axis, and an (n+1)th arm which is provided to rotate around an (n+1)th rotating axis which is an axial direction different from an axial direction of the n-th rotating axis, in the n-th arm, in which the length of the n-th arm is longer than the length of the (n+1)th arm, and in which, when viewed from the (n+1)th rotating axis, the n-th arm and the (n+1)th arm overlap each other.

With this configuration, it is possible to reduce the space for preventing interference of the robot when the tip end of the (n+1)th arm is moved to a position different by 180° around the n-th rotating axis. Accordingly, it is possible to reduce the size of the cell, and to reduce the size of an installation space for installing the robot system. In addition, since the robot is movable in the cell, the robot can perform work within a wider range.

Application Example 2

In the robot system according to the application example of the invention, it is preferable that the robot moves in a first direction with respect to the cell, and the width of the cell in a second direction which is orthogonal to the first direction is narrower than the width of the cell in the first direction.

With this configuration, the robot can perform work within a wider range in the first direction. In addition, for example, in a manufacturing line, it is possible to use the robot system as a subline which performs detecting or processing of a component with respect to a main line which transports the component or the like.

Application Example 3

In the robot system according to the application example of the invention, it is preferable that the width of the cell in the second direction is less than 750 $mm^2$.

With this configuration, the width of the cell is the width which is close to the size of a work region where a human worker works. For this reason, for example, in the manufacturing line, it is possible to more simply perform exchange between the human worker and the robot cell. As a result, for example, without a substantial change, such as a change of the entire manufacturing line, by exchanging the human worker and the cell, it is possible to more easily configure the subline by the robot system.

Application Example 4

In the robot system according to the application example of the invention, it is preferable that the width of the cell in the second direction is less than 650 $mm^2$.

With this configuration, the width of the cell is substantially equivalent to or equal to or less than the size of the work region where the human worker works. For this reason, for example, in the manufacturing line, it is possible to more easily perform the exchange between the human worker and the robot cell. As a result, without a substantial change, such as a change of the entire manufacturing line, by exchanging the human worker and the cell, it is possible to more easily configure the subline by the robot system.

Application Example 5

In the robot system according to the application example of the invention, it is preferable that the robot includes a base which is provided in the cell, and the n-th arm (n is 1) is provided on the base.

With this configuration, it is possible to rotate a first arm and a second arm with respect to the base.

Application Example 6

In the robot system according to the application example of the invention, it is preferable that the robot is provided so that a connection part between the base and the n-th arm is positioned above a connection part between the n-th arm and the (n+1)th arm in a vertical direction.

With this configuration, it is possible to provide the robot to be suspended, and accordingly, to further widen the work range of the robot below the robot in the vertical direction.

Application Example 7

In the robot system according to the application example of the invention, it is preferable that the cell includes a ceiling portion, and the base is provided in the ceiling portion.

With this configuration, it is possible to provide the robot provided to be suspended by the ceiling portion, and accordingly, to further widen the work range of the robot below the robot in the vertical direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot system according to the invention will be described in detail based on appropriate embodiments illustrated in the attached drawings.

First Embodiment

Figure 1:
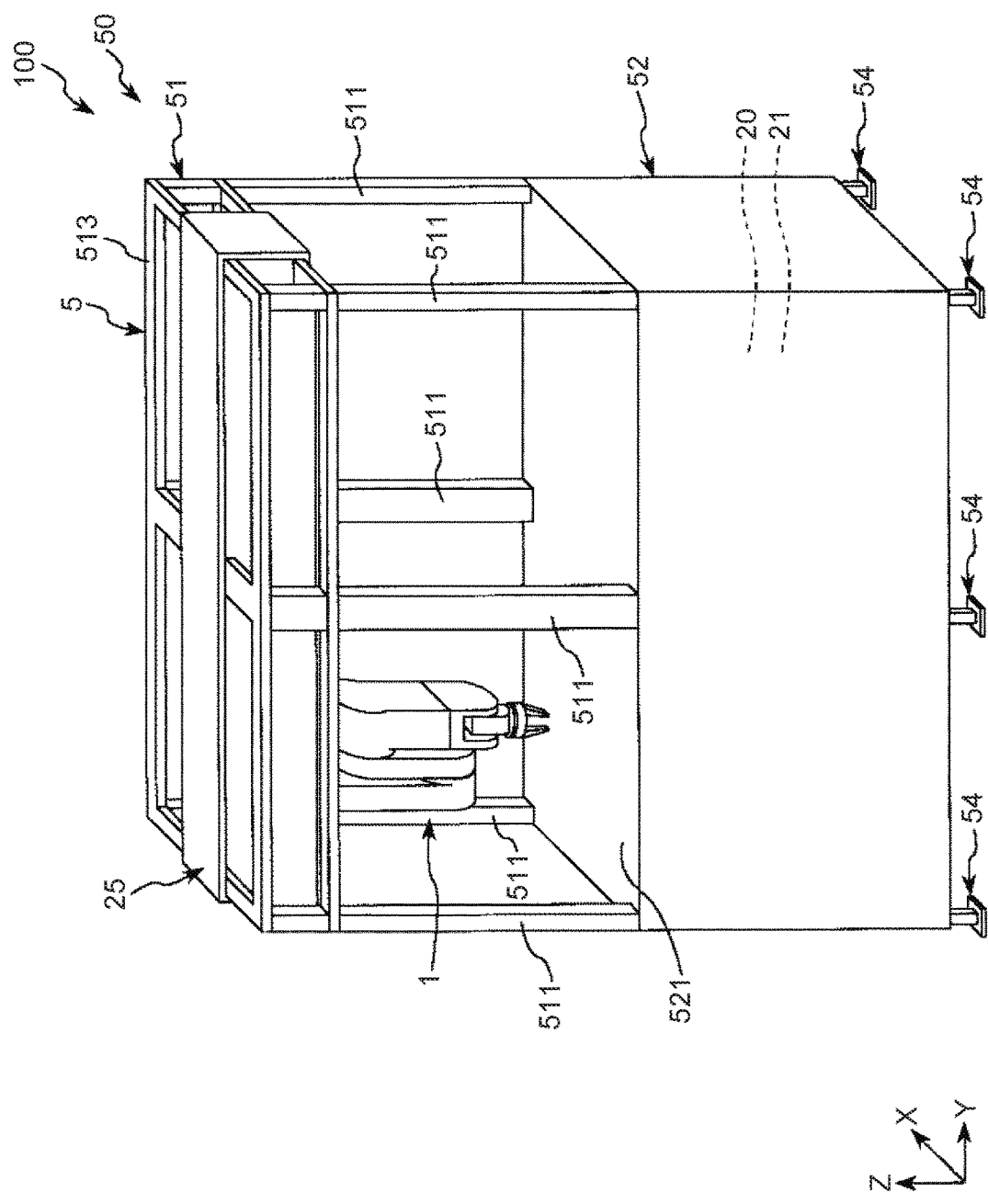
FIG. 1 is a perspective view illustrating a first embodiment of a robot system according to the invention.
Figure 2A:
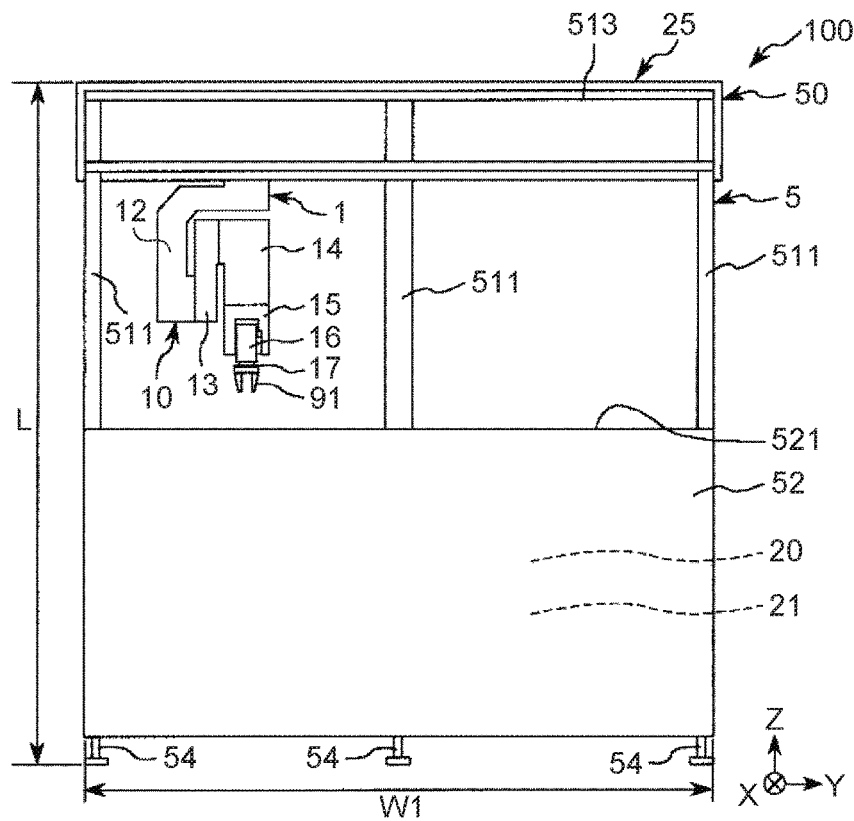
FIGS. 2A and 2B are side views of the robot system illustrated in FIG. 1.
Figure 2B:
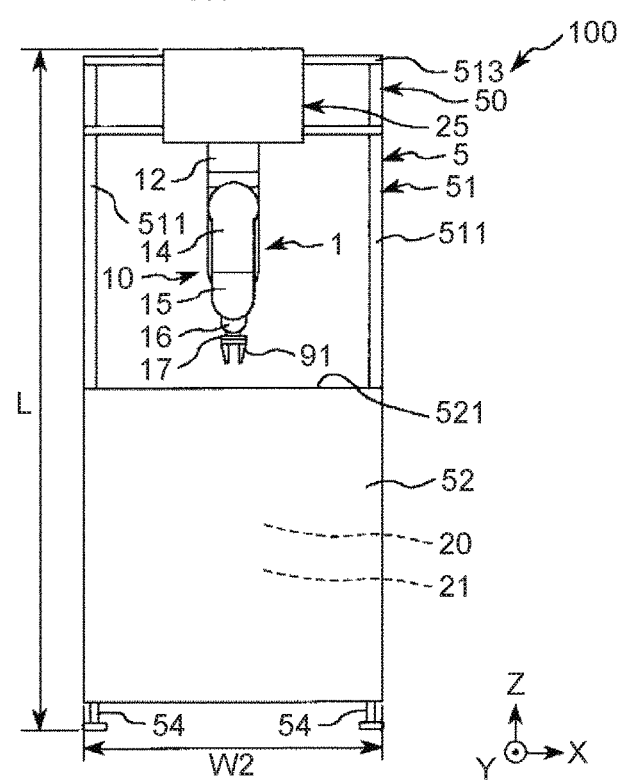
Figure 3:
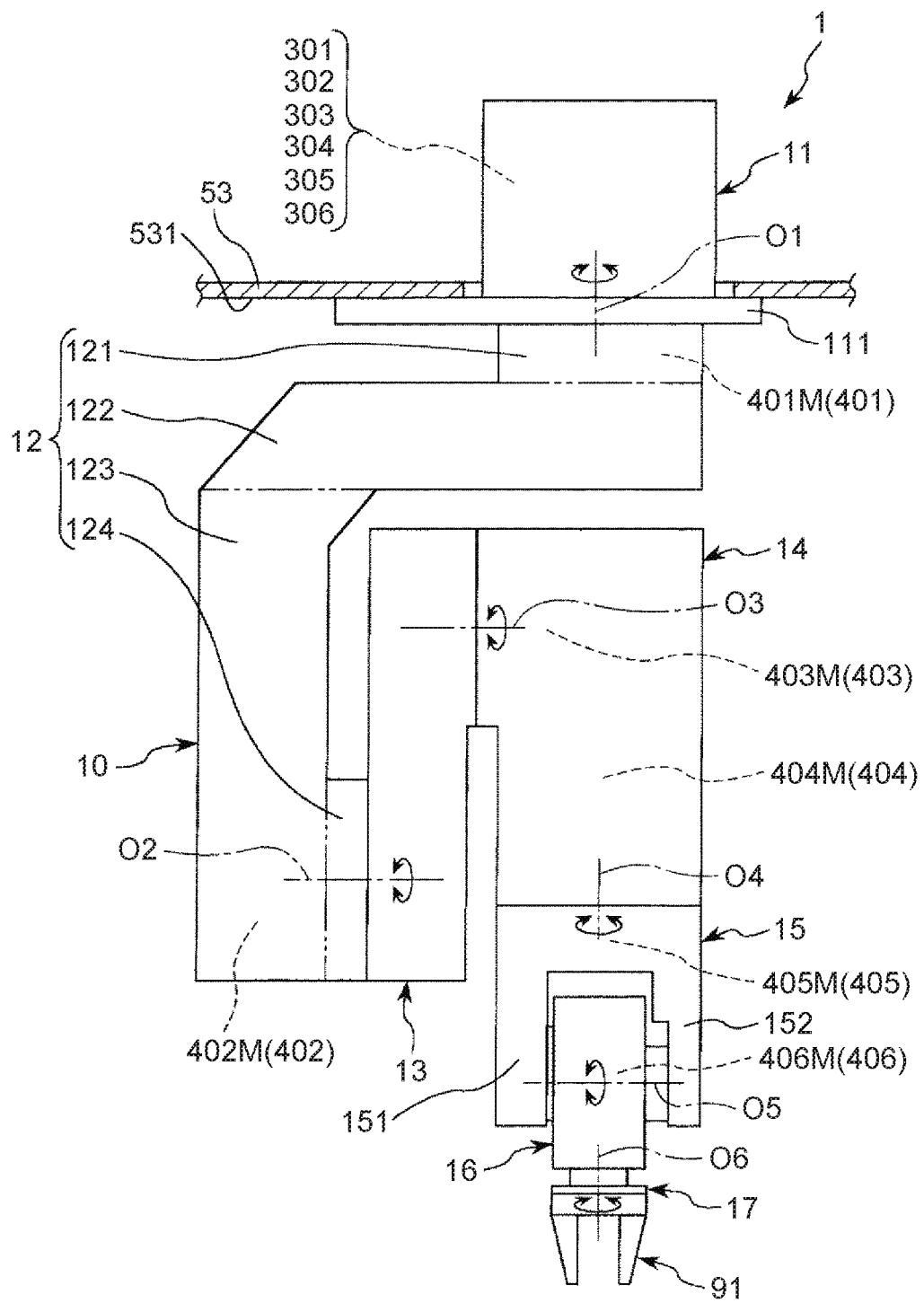
FIG. 3 is a front view of the robot illustrated in FIG. 1.
Figure 4:
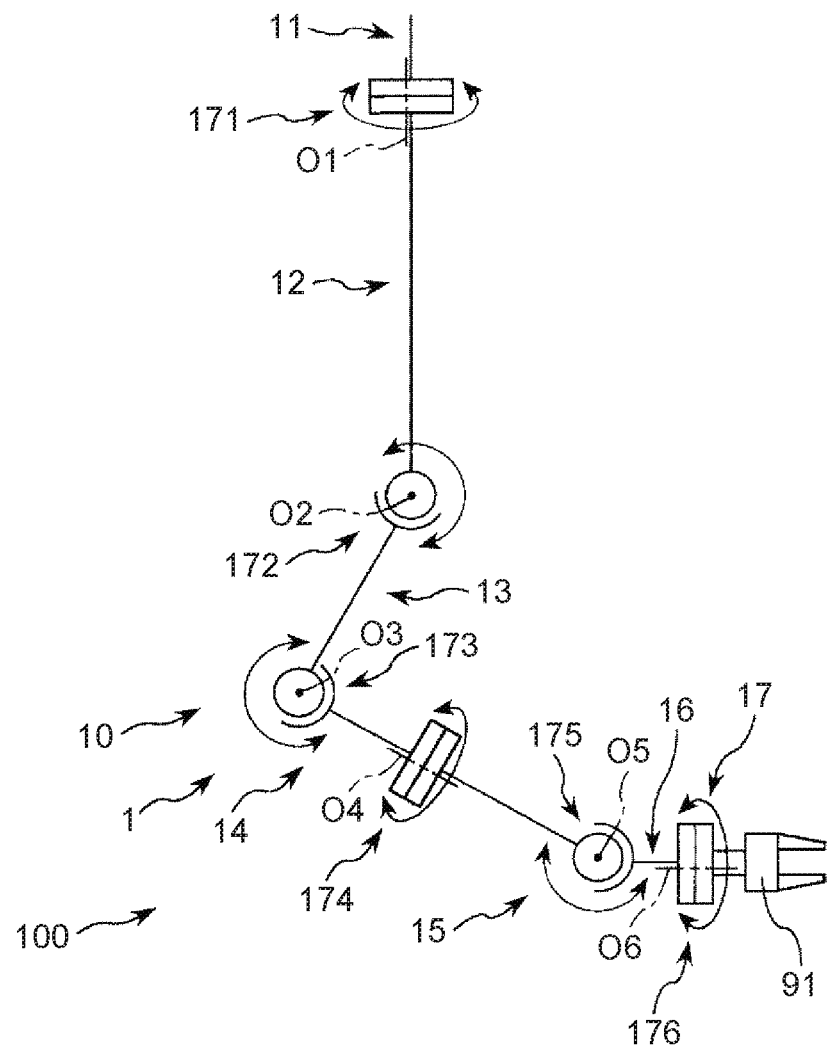
FIG. 4 is a schematic view of the robot illustrated in FIG. 1.
Figure 5:
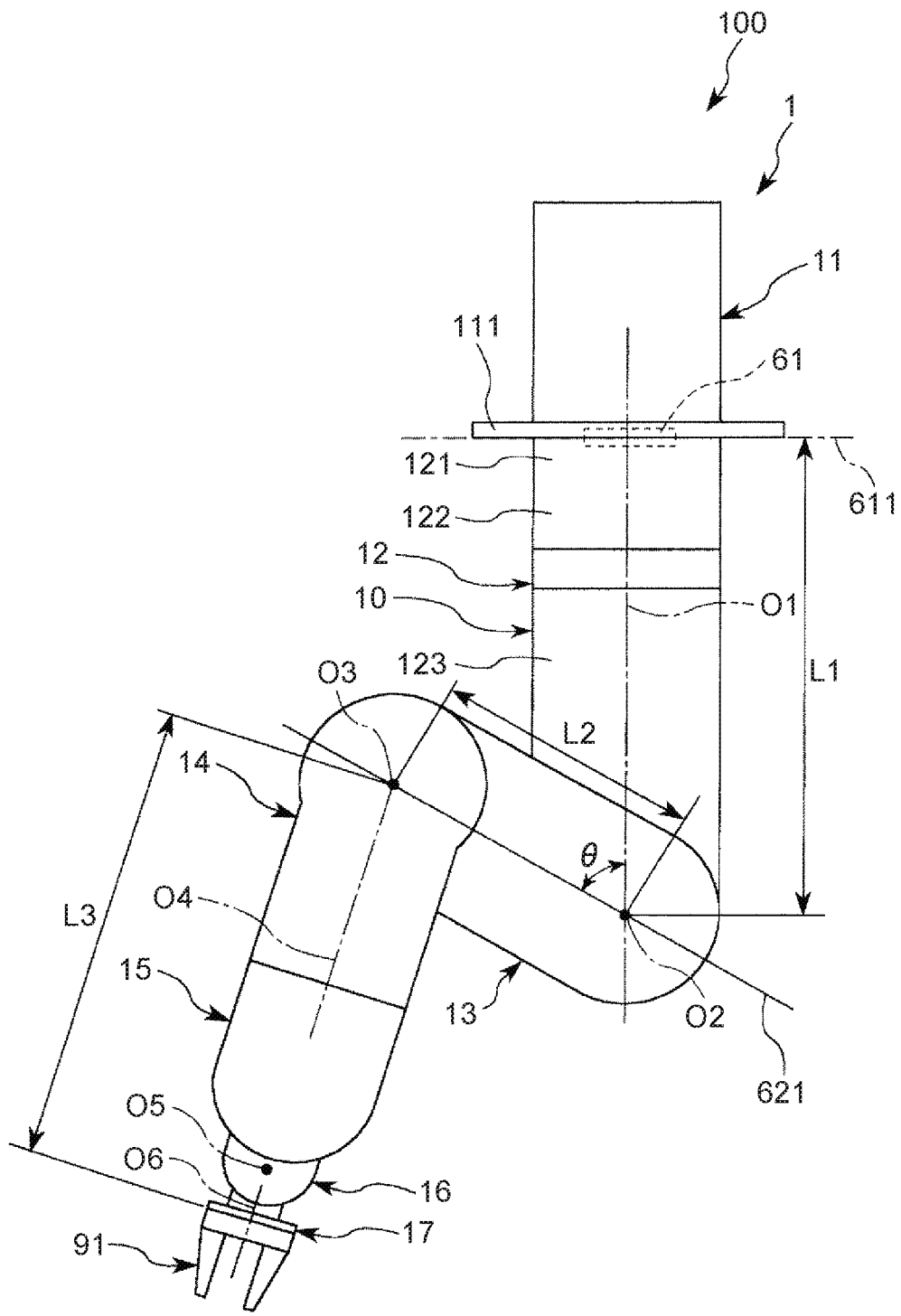
FIG. 5 is a side view of the robot illustrated in FIG. 1.
Figure 6:
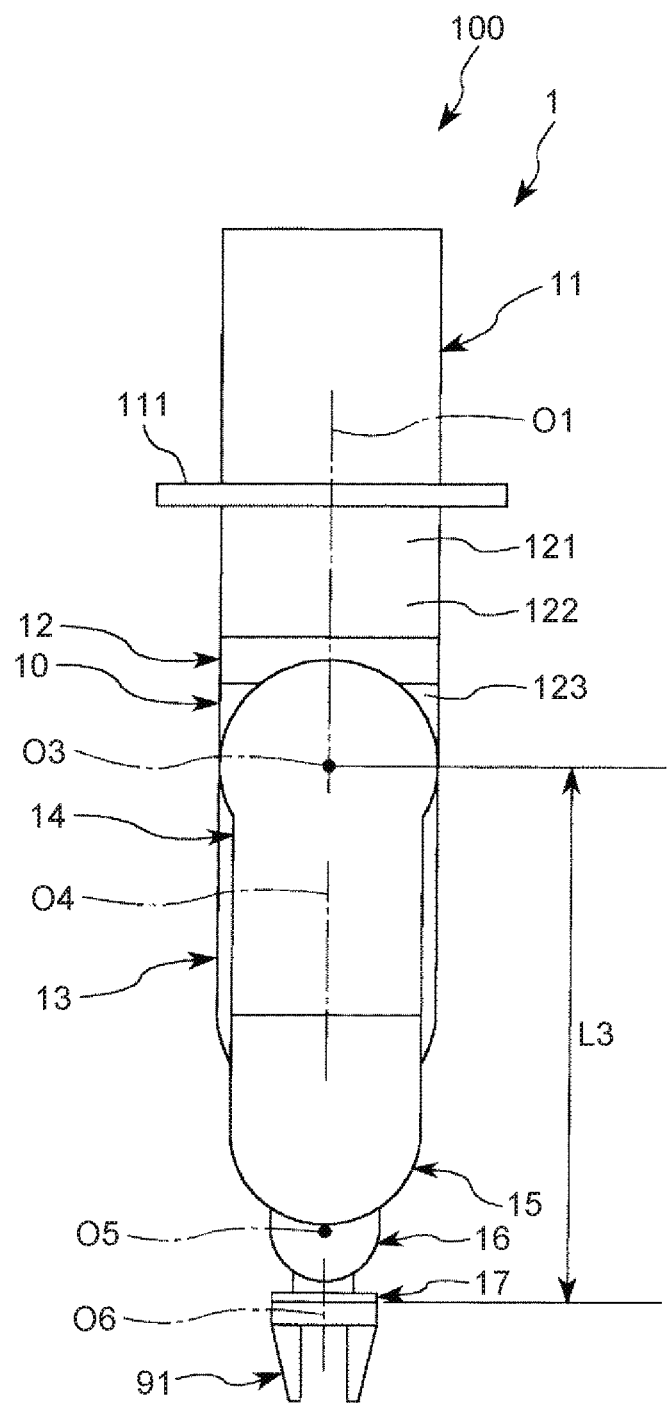
FIG. 6 is a side view of the robot illustrated in FIG. 1.
Figure 7:
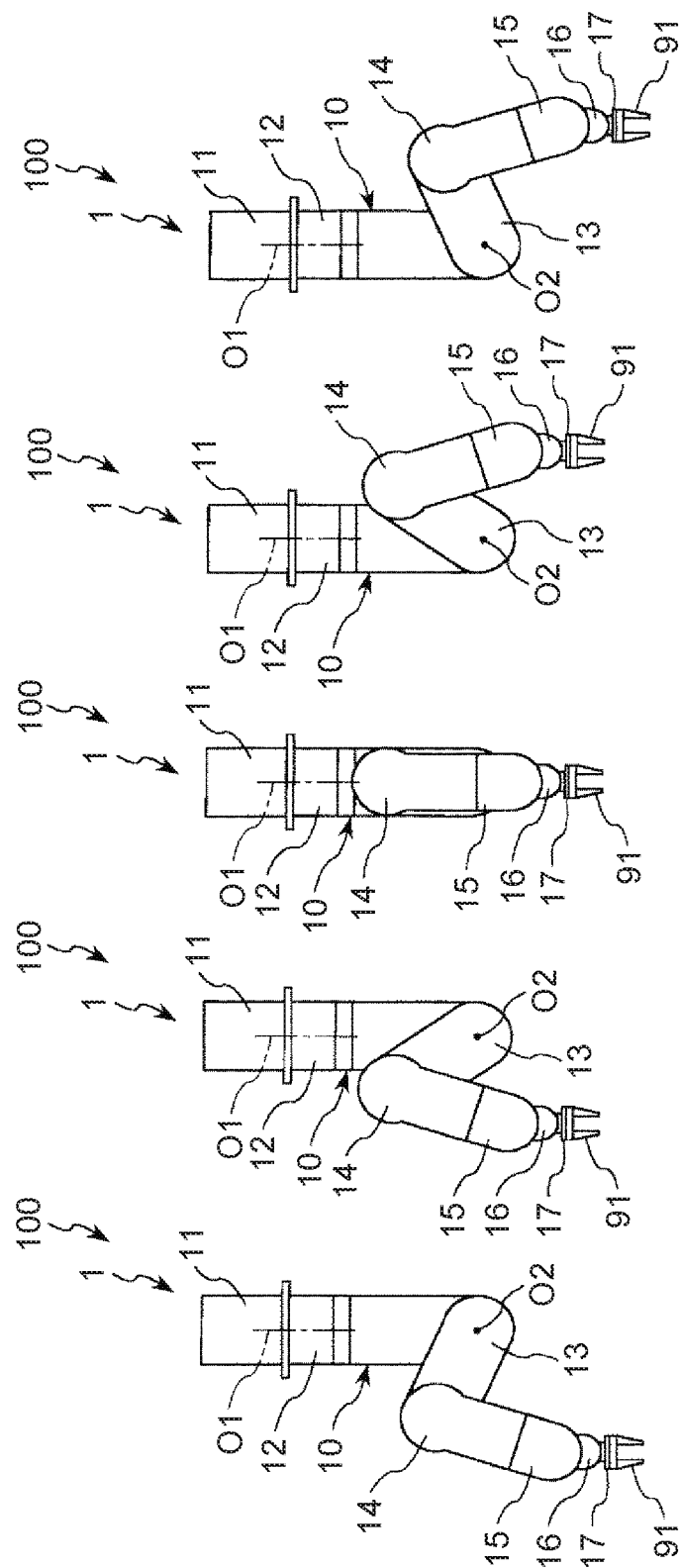
FIGS. 7A to 7E are views illustrating an operation of the robot illustrated in FIG. 1.
Figure 8:
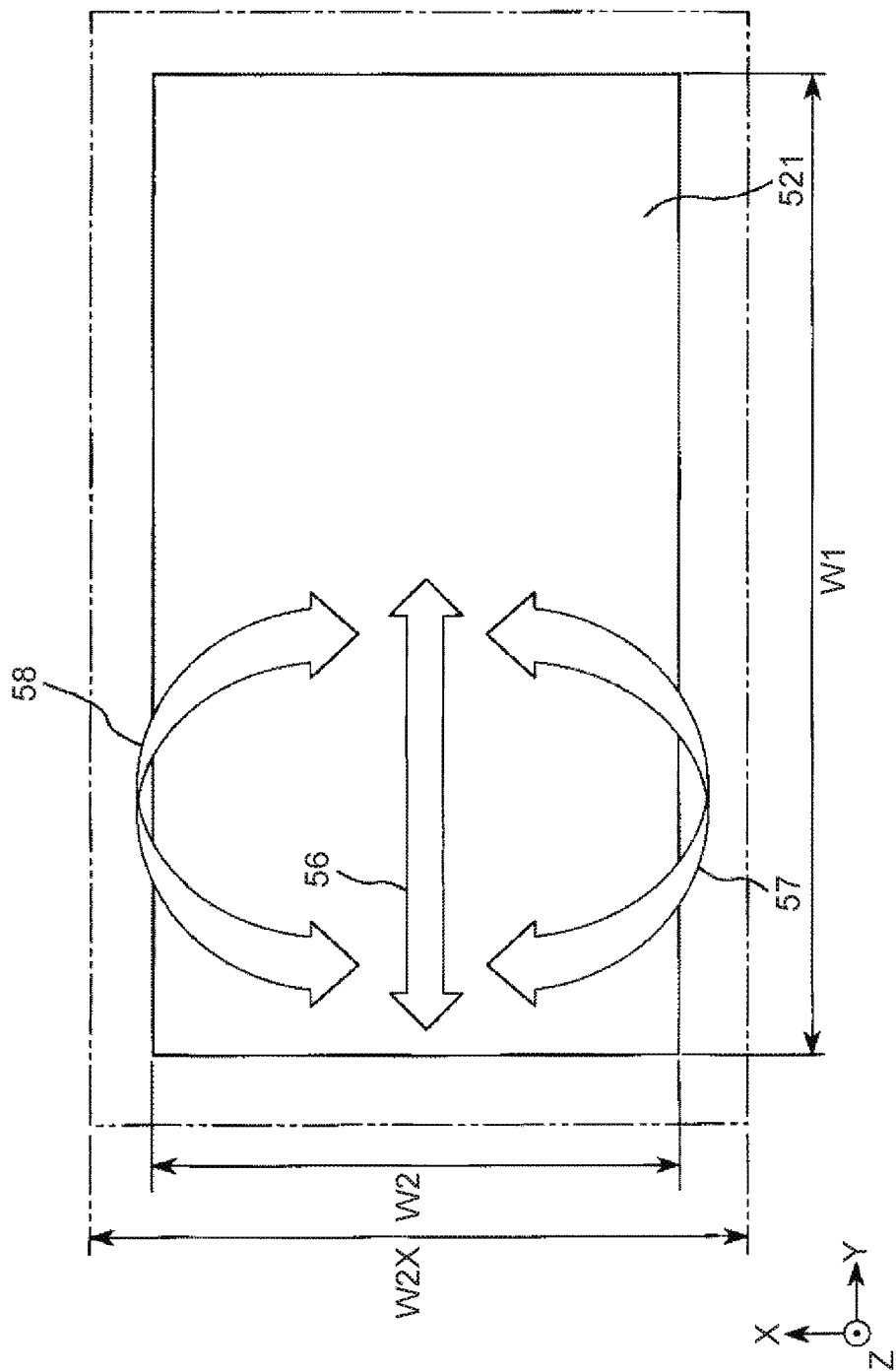
FIG. 8 is a view illustrating movement of a tip end portion of a robot arm included in the robot illustrated in FIG. 1.
Figure 9:
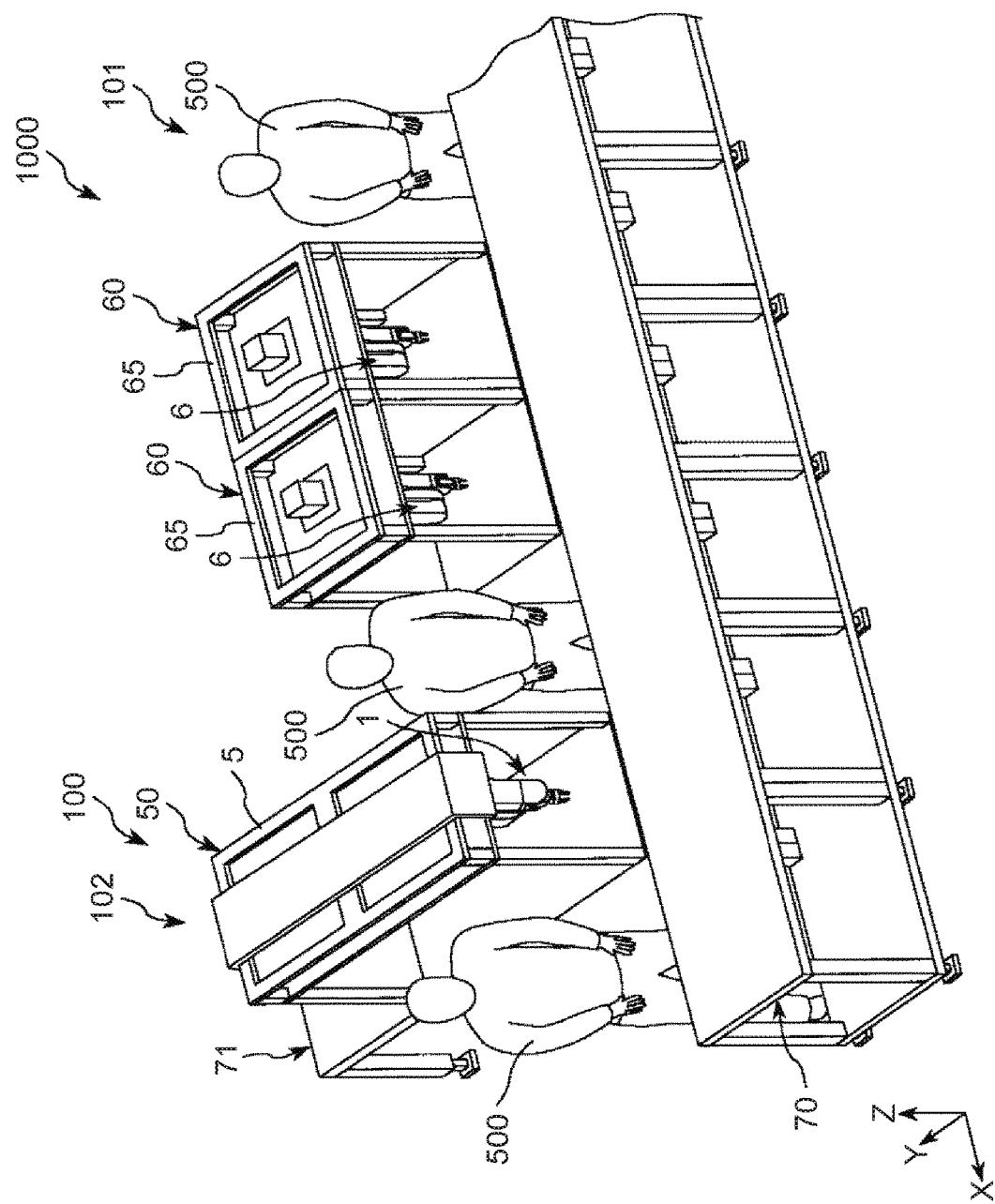
FIG. 9 is a view illustrating an example of a manufacturing line which uses the robot system illustrated in FIG. 1.

FIG. 1 is a perspective view illustrating a first embodiment of the robot system according to the invention. FIGS. 2A and 2B are side views of the robot system illustrated in FIG. 1. FIG. 3 is a front view of the robot illustrated in FIG. 1. FIG. 4 is a schematic view of the robot illustrated in FIG. 1. FIGS. 5 and 6 are respectively side views of the robot illustrated in FIG. 1. FIGS. 7A to 7E are views illustrating an operation of the robot illustrated in FIG. 1. FIG. 8 is a view illustrating movement of a tip end portion of a robot arm included in the robot illustrated in FIG. 1. FIG. 9 is a view illustrating an example of a manufacturing line which uses the robot system illustrated in FIG. 1. FIGS. 10A to 10C, and 11A to 11C are respectively views illustrating an operation of the robot in the manufacturing line illustrated in FIG. 9. FIG. 12 is a view illustrating a moving path of the tip end portion of the robot arm in the manufacturing line illustrated in FIG. 9.

In addition, hereinafter, for convenience of description, an upper side in FIGS. 1 to 7A to 7E, 10A to 10C, and 11A to 11C is "upper" or "upward side", and a lower side is "lower" or "downward side". In addition, a base side in FIGS. 3 to 7A to 7E is "based end" or "upstream", and a side opposite thereto (hand side) is "tip end" or "downstream". In addition, an up-and-down direction in FIGS. 1 to 7A to 7E, 10A to 10C, and 11A to 11C is a "vertical direction", and a leftward-and-rightward direction is a "horizontal direction". In addition, in FIGS. 1, 2A, 2B, 8 to 12, for convenience of description, an X-axis, a Y-axis, and a Z-axis are illustrated as three axes which are orthogonal to each other. The axes are also the same in FIGS. 13 and 14 which will be described later. In addition, hereinafter, a direction which is parallel to the X-axis is an "X-axis direction (second direction)", a direction which is parallel to the Y-axis is a "Y-axis direction (first direction)", and a direction which is parallel to the Z-axis is a "Z-axis direction".

A robot system 100 illustrated in FIG. 1 includes a cell 5, and a robot cell 50 including a robot 1. In addition, the robot system 100 includes a robot control portion 20 which controls an operation of the robot 1, and a movement control portion 21 which controls movement of the robot 1 in the cell 5.

The robot system 100 can be used in a manufacturing process of manufacturing a precision machine, such as a watch. In addition, the robot 1 can perform work, such as supplying, removing, transporting, and assembling a precision machine or components that configure a precision machine.

Cell

As illustrated in FIGS. 1, and 2A and 2B, the cell 5 is a frame body which surrounds the robot 1, and easily performs relocation. A width W2 (the length in the X-axis direction) in a lateral direction of the cell 5 is narrower than a width W1 (the length in the Y-axis direction) in the longitudinal direction, and is substantially a half of the width W1 in the embodiment (refer to FIGS. 2A and 2B). In addition, in the cell 5, the robot 1 is movable in the longitudinal direction (Y-axis direction) of the cell 5.

The cell 5 includes six leg portions 54 which install the entire cell 5 in an installation space, such as a ground surface (floor), a workbench (base portion) 52 which is supported by the leg portions 54, a frame body portion 51 which is provided on the workbench 52, and a moving mechanism 25 which is provided above the frame body portion 51 and moves the robot 1 in the longitudinal direction of the cell 5.

In the workbench 52, the robot control portion 20 which controls the operation of the robot 1, and the movement control portion 21 which controls the driving of the moving mechanism 25 are embedded. The robot control portion 20 and the movement control portion 21 can be configured of a personal computer (PC) or the like in which a central processing unit (CPU) is embedded. In addition, in the embodiment, the robot control portion 20 and the movement control portion 21 are embedded in the workbench 52, but for example, the robot control portion 20 and the movement control portion 21 may be embedded in the robot 1, and may be provided to be separated from the robot cell 50.

In addition, an upper surface of the workbench 52 opposes the moving mechanism 25, and is a work surface 521 on which the robot 1 can perform work of supplying and removing the component.

In addition, on the work surface 521, the frame body portion 51 is provided. The frame body portion 51 includes six columns (supporting columns) 511 which extend in the vertical direction, and a frame-shaped ceiling portion 513 which is provided at the upper ends of the six columns 511. In addition, between the adjacent columns 511 (side surface portion of the frame body portion 51), and in the ceiling portion 513, a safety plate (not illustrated) may be installed to prevent an operator or foreign substances, such as dust, from infiltrating into the frame body portion 51.

In addition, in the ceiling portion 513, the moving mechanism 25 is provided. The moving mechanism 25 supports the robot 1 to be capable of reciprocating in the longitudinal direction of the cell 5. The moving mechanism 25 includes a driving source (not illustrated) which generates power for moving the robot 1, and a power transfer mechanism (not illustrated) which transfers the power of the driving source to the robot 1. Examples of the driving source include a motor, such as a servo motor, stepping motor, and a linear motor, a hydraulic cylinder, and a pneumatic cylinder. In addition, examples of the power transfer mechanism include a combination of a belt, a gear, a rack, and a pinion, and a combination of a ball screw and a ball nut. By controlling the driving of the moving mechanism 25 by the movement control portion 21, it is possible to move the robot 1 in the cell 5.

In addition, in the description above, the cell 5 includes the leg portions 54, but may not include the leg portions 54. In this case, the workbench 52 may be directly installed in the installation space.

Robot

As illustrated in FIG. 3, the robot 1 includes abase 11, and a robot arm 10. The robot arm 10 includes a first arm (an n-th arm) 12, a second arm (an (n+1)th arm) 13, a third arm 14, a fourth arm 15, a fifth arm 16, and a sixth arm 17 (six arms); and a first driving source 401, a second driving source 402, a third driving source 403, a fourth driving source 404, a fifth driving source 405, and a sixth driving source 406 (six driving sources). In addition, an end effector including a hand 91 which grabs a precision machine, such as a watch, and components, is configured to be attachable to and detachable from the tip end of the sixth arm 17.

The robot 1 is a vertical articulated (6 axes) robot in which the base 11, the first arm 12, the second arm 13, the third arm 14, the fourth arm 15, the fifth arm 16, and the sixth arm 17 are linked to each other from a base end side to a tip end side in this order. In addition, hereinafter, each of the first arm 12, the second arm 13, the third arm 14, the fourth arm 15, the fifth arm 16, and the sixth arm 17 is also called an "arm". In addition, each of the first driving source 401, the second driving source 402, the third driving source 403, the fourth driving source 404, the fifth driving source 405, and the sixth driving source 406 is also called a "driving source (driving portion)".

In addition, the base 11 is a part (attached member) fixed to the moving mechanism 25. In addition, the part fixed to the moving mechanism 25 may be the base 11, or may be a flange 111.

In addition, in the base 11, a joint 171 which will be described later may be included, and may not be included (refer to FIG. 4).

As illustrated in FIG. 3, the robot arm 10 is supported to be rotatable with respect to the base 11, and each of the arms 12 to 17 is supported to be displaceable being separated with respect to base 11.

The first arm 12 is formed to be bent. The first arm 12 includes a first part 121 which is connected to the base 11 and extends downward in the vertical direction from the base 11, a second part 122 which extends in the horizontal direction from a lower end of the first part 121, a third part 123 which is provided in an end portion of the second part 122 opposite to the first part 121, and extends in the vertical direction, and a fourth part 124 which extends in the horizontal direction from a tip end of the third part 123. In addition, the first part 121, the second part 122, the third part 123, and the fourth part 124 are formed to be integrated. In addition, when viewed from a near side of a paper surface of FIG. 3 (when viewed from a front surface which is orthogonal to both a first rotating axis O1 and a second rotating axis O2 which will be described later), the second part 122 and the third part 123 are substantially orthogonal (intersect) to each other.

The second arm 13 has a longitudinal shape, and is connected to the tip end portion (an end portion of the fourth part 124 opposite to the third part 123) of the first arm 12.

The third arm 14 has a longitudinal shape, and is connected to an end portion opposite to the end portion to which the first arm 12 is connected in the second arm 13.

The fourth arm 15 is connected to an end portion opposite to the end portion to which the second arm 13 is connected in the third arm 14. The fourth arm 15 includes one pair of supporting portions 151 and 152 which oppose each other. The supporting portions 151 and 152 are used in connection with the fifth arm 16.

The fifth arm 16 is positioned between the supporting portions 151 and 152, and is linked to the fourth arm 15 as being connected to the supporting portions 151 and 152.

The sixth arm 17 has a shape of a flat plate, and is connected to a tip end portion of the fifth arm 16. In addition, in a tip end portion (an end portion opposite to the fifth arm 16) of the sixth arm 17, the hand 91 is mounted to be attachable and detachable. The hand 91 is not particularly limited, and an example thereof includes a configuration in which a plurality of finger portions (fingers) are provided.

In addition, each exterior of each of the above-described arms 12 to 17 may be configured of one member, or may be configured of a plurality of members.

Next, with reference to FIGS. 3 and 4, the driving sources 401 to 406 will be described together with the driving of the arms 12 to 17. In addition, FIG. 4 illustrates a schematic view of the robot 1, and illustrates a state viewed from a right side of FIG. 3. In addition, in FIG. 4, a state where the arms 13 to 17 are rotated from the state illustrated in FIG. 3 is illustrated.

As illustrated in FIG. 4, the base 11 and the first arm 12 are linked to each other via the joint (connection part) 171. The joint 171 includes a mechanism which supports the first arm 12 linked to the base 11 to be rotatable with respect to the base 11. Accordingly, the first arm 12 can rotate around the first rotating axis (an n-th rotating axis) O1 (around the first rotating axis O1) parallel to the vertical direction, with respect to the base 11. In addition, the first rotating axis O1 is a rotating axis which is furthest on the upstream side of the robot 1. The rotation around the first rotating axis O1 is performed by driving the first driving source 401 which includes a motor 401M. In addition, the first driving source 401 is driven by the motor 401M and a cable (not illustrated), and the motor 401M is controlled by a robot control device via an electrically connected motor driver 301. In addition, the first driving source 401 may be configured to transfer a driving force from the motor 401M by a speed reducer (not illustrated) provided together with the motor 401M, or the speed reducer may be omitted.

In addition, the first arm 12 and the second arm 13 are linked to each other via a joint (connection part) 172. The joint 172 includes a mechanism which supports one of the first arm 12 and the second arm 13 that are linked to each other to be rotatable with respect to the other. Accordingly, the second arm 13 can rotate around the second rotating axis (an (n+1)th rotating axis) O2 (around the second rotating axis O2) parallel to the horizontal direction, with respect to the first arm 12. The second rotating axis O2 is orthogonal to the first rotating axis O1. The rotation around the second rotating axis O2 is performed by driving the second driving source 402 which includes a motor 402M. In addition, the second driving source 402 is driven by the motor 402M and a cable (not illustrated), and the motor 402M is controlled by a robot control device via an electrically connected motor driver 302. In addition, the second driving source 402 may be configured to transfer a driving force from the motor 402M by a speed reducer (not illustrated) provided together with the motor 402M, or the speed reducer may be omitted. In addition, the second rotating axis O2 may be parallel to an axis which is orthogonal to the first rotating axis O1 and the second rotating axis O2 may not be orthogonal to the first rotating axis O1, or the axial directions may be different from each other.

In addition, the second arm 13 and the third arm 14 are linked to each other via a joint (connection part) 173. The joint 173 includes a mechanism which supports one of the second arm 13 and the third arm 14 that are linked to each other to be rotatable with respect to the other. Accordingly, the third arm 14 can rotate around a third rotating axis O3 (around the third rotating axis O3) parallel to the horizontal direction, with respect to the second arm 13. The third rotating axis O3 is parallel to the second rotating axis O2. The rotation around the third rotating axis O3 is performed by driving the third driving source 403. In addition, the third driving source 403 is driven by a motor 403M and a cable (not illustrated), and the motor 403M is controlled by a robot control device via an electrically connected motor driver 303. In addition, the third driving source 403 may be configured to transfer a driving force from the motor 403M by a speed reducer (not illustrated) provided together with the motor 403M, or the speed reducer may be omitted.

In addition, the third arm 14 and the fourth arm 15 are linked to each other by a joint (connection part) 174. The joint 174 includes a mechanism which supports at least one of the third arm 14 and the fourth arm 15 that are linked to each other to be rotatable with respect to the other. Accordingly, the fourth arm 15 can rotate around a fourth rotating axis O4 (around the fourth rotating axis O4) parallel to a central axial direction of the third arm 14, with respect to the third arm 14. The fourth rotating axis O4 is orthogonal to the third rotating axis O3. The rotation around the fourth rotating axis O4 is performed by driving the fourth driving source 404. In addition, the fourth driving source 404 is driven by a motor 404M and a cable (not illustrated), and the motor 404M is controlled by a robot control device via an electrically connected motor driver 304. In addition, the fourth driving source 404 may be configured to transfer a driving force from the motor 404M by a speed reducer (not illustrated) provided together with the motor 404M, or the speed reducer may be omitted. In addition, the fourth rotating axis O4 may be parallel to the axis which is orthogonal to the third rotating axis O3 and the fourth rotating axis O4 may not be orthogonal to the third rotating axis O3, or the axial directions may be different from each other.

In addition, the fourth arm 15 and the fifth arm 16 are linked to each other by a joint (connection part) 175. The joint 175 includes a mechanism which supports one of the fourth arm 15 and the fifth arm 16 that are linked to each other to be rotatable with respect to the other. Accordingly, the fifth arm 16 can rotate around a fifth rotating axis O5 (around the fifth rotating axis O5) orthogonal to a central axial direction of the fourth arm 15, with respect to the fourth arm 15. The fifth rotating axis O5 is orthogonal to the fourth rotating axis O4. The rotation around the fifth rotating axis O5 is performed by driving the fifth driving source 405. In addition, the fifth driving source 405 is driven by a motor 405M and a cable (not illustrated), and the motor 405M is controlled by a robot control device via an electrically connected motor driver 305. In addition, the fifth driving source 405 may be configured to transfer a driving force from the motor 405M by a speed reducer (not illustrated) provided together with the motor 405M, or the speed reducer may be omitted. In addition, the fifth rotating axis O5 may be parallel to the axis which is orthogonal to the fourth rotating axis O4 and the fifth rotating axis O5 may not be orthogonal to the fourth rotating axis O4, or the axial directions may be different from each other.

In addition, the fifth arm 16 and the sixth arm 17 are linked to each other by a joint (connection part) 176. The joint 176 includes a mechanism which supports one of the fifth arm 16 and sixth arm 17 that are linked to each other to be rotatable with respect to the other. Accordingly, the sixth arm 17 can rotate around a sixth rotating axis O6 (around the sixth rotating axis O6), with respect to the fifth arm 16. The sixth rotating axis O6 is orthogonal to the fifth rotating axis O5. The rotation around the sixth rotating axis O6 is performed by driving the sixth driving source 406. In addition, the sixth driving source 406 is driven by a motor 406M and a cable (not illustrated), and the motor 406M is controlled by a robot control device via an electrically connected motor driver 306. In addition, the sixth driving source 406 may be configured to transfer a driving force from the motor 406M by a speed reducer (not illustrated) provided together with the motor 406M, or the speed reducer may be omitted. In addition, the sixth rotating axis O6 may be parallel to the axis which is orthogonal to the fifth rotating axis O5 and the sixth rotating axis O6 may not be orthogonal to the fifth rotating axis O5, or the axial directions may be different from each other.

In addition, the robot 1 which is driven in this manner can perform various types of work, such as transporting the precision machine or the component by controlling the operation of the arms 12 to 17 while grabbing the precision machine or the component by the hand 91 connected to the tip end portion of the sixth arm 17. In addition, the driving of the hand 91 is controlled by the robot control device.

Above, the configuration of the robot 1 is simply described.

Next, with reference to FIGS. 5, 6, and 7A to 7E, a relationship between the arms 12 to 17 will be described, but will be described from various points of view changing the expressions or the like. In addition, regarding the third arm 14, the fourth arm 15, the fifth arm 16, and the sixth arm 17, a state where the arms are straightly extended, that is, as illustrated in FIGS. 5 and 6, a state where the fourth rotating axis O4 and the sixth rotating axis O6 match each other or are parallel to each other, is considered.

First, as illustrated in FIG. 5, a length L1 of the first arm 12 is set to be longer than a length L2 of the second arm 13.

Here, the length L1 of the first arm 12 is a distance between the second rotating axis O2 and a center line 611 which extends in the leftward-and-rightward direction in FIG. 5 of a bearing portion 61 (a member included in the joint 171) which supports the first arm 12 to be rotatable, when viewed from the axial direction of the second rotating axis O2. In addition, the length L2 of the second arm 13 is a distance between the second rotating axis O2 and the third rotating axis O3, when viewed from the axial direction of the second rotating axis O2.

In addition, as illustrated in FIG. 6, the robot 1 is configured to make it possible for an angle θ made by the first arm 12 and the second arm 13 to become 0°, when viewed from the axial direction of the second rotating axis O2. In other words, the robot 1 is configured to make it possible for the first arm 12 and the second arm 13 to overlap each other, when viewed from the axial direction of the second rotating axis O2. In addition, when the angle θ is 0°, that is, when the first arm 12 and the second arm 13 overlap each other when viewed from the axial direction of the second rotating axis O2, the second arm 13 is configured not to interfere with the second part 122 of the first arm 12, the moving mechanism 25, and the ceiling portion 513.

Here, the angle θ made by the first arm 12 and the second arm 13 is an angle made by a straight line (a center axis of the second arm 13 when viewed from the axial direction of the second rotating axis O2) 621 which passes through the second rotating axis O2 and the third rotating axis O3, and the first rotating axis O1, when viewed from the axial direction of the second rotating axis O2 (refer to FIG. 5).

In addition, as illustrated in FIG. 6, the robot 1 is configured to make it possible for the second arm 13 and the third arm 14 to overlap each other when viewed from the axial direction of the second rotating axis O2. In other words, the robot 1 is configured to make it possible for the first arm 12, the second arm 13, and the third arm 14 to overlap each other at the same time when viewed from the axial direction of the second rotating axis O2.

In addition, a length L3 which is the total length of the third arm 14, the fourth arm 15, the fifth arm 16, and the sixth arm 17 is set to be longer than the length L2 of the second arm 13. Accordingly, when viewed from the axial direction of the second rotating axis O2, in a case where the second arm 13 and the third arm 14 overlap each other, it is possible to make the tip end of the robot arm 10, that is, the tip end of the sixth arm 17, protrude from the second arm 13. According to this, it is possible to prevent interference of the hand 91 with the first arm 12 and the second arm 13.

Here, the length L3 which is the total length of the third arm 14, the fourth arm 15, the fifth arm 16, and the sixth arm 17 is a distance between the third rotating axis O3 and the tip end of the sixth arm 17, when viewed from the axial direction of the second rotating axis O2 (refer to FIG. 6). In this case, the third arm 14, the fourth arm 15, the fifth arm 16, and the sixth arm 17 are in a state where the fourth rotating axis O4 and the sixth rotating axis O6 match each other as illustrated in FIG. 6, or in a state where the fourth rotating axis O4 and the sixth rotating axis O6 are parallel to each other.

As illustrated in FIGS. 7A, 7B, 7C, 7D, and 7E, the robot 1 does not rotate the first arm 12, and rotate the second arm 13. Accordingly, it is possible to move the tip end of the second arm 13 to a position different by 180° around the first rotating axis O1 via a state where the angle θ becomes 0° when viewed from the axial direction of the second rotating axis O2. For this reason, it is possible to move the tip end of the robot arm 10 to a position (second position) illustrated in FIG. 7E different by 180° around the first rotating axis O1 from the position illustrated in FIG. 7A, from a position (first position) illustrating the tip end (tip end of the sixth arm 17) of the robot arm 10 as illustrated in FIG. 7A, via a state where the first arm 12 and the second arm 13 overlap each other as illustrated in FIG. 7C. In addition, during the movement, each of the third arm 14, the fourth arm 15, the fifth arm 16, and the sixth arm 17 is rotated as necessary.

As illustrated in FIG. 8, by driving the robot arm 10 as described above, the robot 1 can move the hand 91 to a position different by 180° around the first rotating axis O1 by performing an operation of moving the hand 91 as illustrated by an arrow 56, without performing an operation of moving the hand 91 as illustrated by arrows 57 and 58. In other words, the robot 1 can move the hand 91 to a position different by 180° around the first rotating axis O1 by performing an operation of moving the hand 91 (tip end of the robot arm 10) on a straight line when viewed from the axial direction of the first rotating axis O1. Accordingly, since it is possible to reduce the size of the space for preventing interference of the robot 1, it is possible to reduce the size of the cell 5. For this reason, as illustrated in FIG. 8, it is possible to reduce the width (the length in the X-axis direction) W2 in the lateral direction when viewed from the vertical direction of the cell 5 to be narrower than a width W2X in the related art. In addition, the width W2 is equal to or less than 80% of the width W2X in the related art.

Specifically, it is preferable that the width W2 is less than 750 mm, and it is more preferable that the width W2 is less than 650 mm (refer to FIG. 2B). Since the robot 1 can also perform the above-described operation in a case of the width W2 as described above, it is possible to drive the robot arm 10 not to interfere with the cell 5. In addition, the width W2 which is less than the above-described upper limit value is substantially equivalent to or equal to or less than the width of the work region where the human worker works. For this reason, when the width W2 is or less than the above-described upper limit value, for example, it is possible to easily perform an exchange between the human worker and the robot cell 50. For this reason, for example, when the manufacturing line is changed by exchanging the human worker and the robot cell 50, it is possible to easily perform the exchange. In addition, it is possible to simply perform an exchange that is the reverse of the description above, that is, the exchange of the robot cell 50 to the human worker. In addition, it is preferable that the width W2 is equal to or greater than 100 mm. Accordingly, it is possible to easily perform maintenance of the inside of the robot cell 50. In addition, the width W2 is an average width in the X-axis direction of the cell 5.

In addition, as described in FIGS. 7A to 7E, the robot 1 can move the hand 91 without substantially changing (while maintaining the height to be substantially constant) the height (position in the vertical direction) of the tip end of the robot arm 10. For this reason, it is possible to further reduce the height (length in the Z-axis direction) L in the vertical direction of the cell 5 to be lower than the height in the related art (refer to FIGS. 2A and 2B). Specifically, it is possible to make the height L of the cell 5 to be equal to or less than 80% of the height in the related art. Accordingly, it is possible to lower the ceiling portion 513, and thus, it is possible to lower the position of the center of gravity of the robot 1 attached (provided) to the ceiling portion 513 via the moving mechanism 25. For this reason, it is possible to reduce oscillation generated by an operation of the robot 1.

Specifically, it is preferable that the height L is equal to or less than 1,700 mm, and it is more preferable that the height L is 1,000 mm to 1,650 mm. When the height L is equal to or less than the upper limit value, it is possible to further suppress the influence of oscillation when the robot 1 is operated in the cell 5. In addition, when the height L is equal to or greater than the lower limit value, it is possible to prevent interference of the robot 1 with the work surface 521, for example. In addition, the above-described height L is an average height of the cell 5 (including the leg portion 54).

Next, with reference to FIG. 9, a manufacturing line 1000 which uses the robot system 100, work which is performed by the robot 1 in the manufacturing line 1000, and an example of an operation of the robot 1 during the work will be described.

The manufacturing line 1000 includes a main line 101 which mainly performs the transporting or the like of the component, and a subline 102 which performs assembly of the component or inspection of the component.

The main line 101 includes a conveyor 70 which performs the transporting or the like of the component (not illustrated), and a human worker 500 and a robot cell 60 which perform the assembly or the like of the component by the conveyor 70. In addition, the robot cell 60 includes a robot 6 which can perform work of supplying, removing, transporting, and assembling various components (not illustrated), and a cell 65 which supports the robot 6.

The subline 102 is connected to the main line 101. The subline 102 is configured of the robot cell 50, and the component supply portion 71 which is connected to the robot cell 50.

The robot cell 50 is provided so that a transporting direction (X-axis direction) of the component of the main line 101 and the lateral direction of the robot cell 50 are substantially parallel to each other. Therefore, the longitudinal direction of the robot cell 50 is substantially orthogonal to the transporting direction of the main line 101. In addition, the component supply portion 71 is provided on a side opposite to a side where the main line 101 of the robot cell 50 is positioned in the embodiment.

In the manufacturing line 1000, in the main line 101, the human worker 500 or the robot 6 in the robot cell 60 performs the work of supplying, removing, and assembling the component. In addition, in the subline 102, the robot 1 in the robot cell 50 performs work of supplying the component from the conveyor 70, assembling the supplied component, and again, sending the component back to the conveyor 70.

Hereinafter, with reference to FIGS. 10A to 10C, 11A to 11C, and 12, an example of work and an operation of the robot 1 in the subline 102 will be described in detail. Here, an operation of the robot 1 when performing the inspection of a component 42 in the component inspecting portion 73 in the cell 5 after transporting components (workpieces) 41 and 42 into the cell 5 from the conveyor 70 and the component supply portion 71, and assembling the component (workpiece) 41 to the component (workpiece) 42 in a component processing portion 72 in the cell 5, will be described. In addition, the component processing portion 72 and the component inspecting portion 73 are not illustrated in FIG. 1, but are provided on the work surface 521 as illustrated in FIGS. 10A to 10C, 11A to 11C, and 12.

Figure 10A:
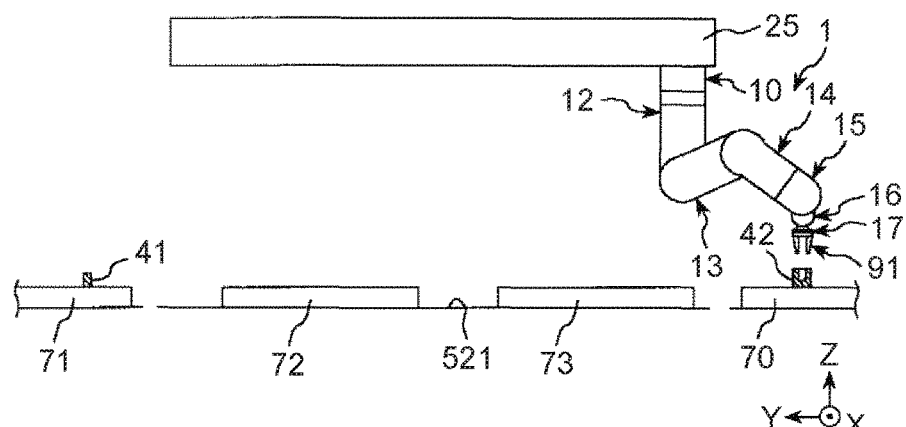
FIGS. 10A to 10C are views illustrating an operation of the robot in the manufacturing line illustrated in FIG. 9.

First, as illustrated in FIG. 10A, the robot 1 drives the robot arm 10, and moves the hand 91 onto the conveyor 70 of the main line 101. After this, the robot 1 grabs the component 42 which is on the conveyor 70 by the hand 91.

Figure 10B:
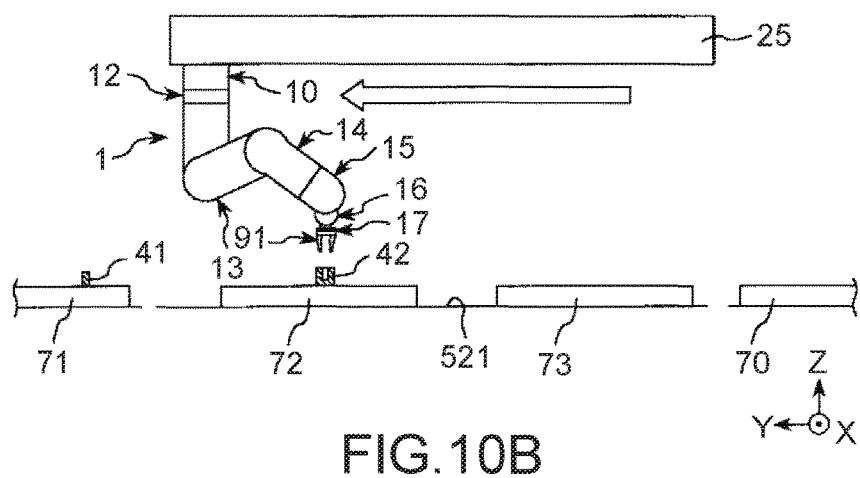

Next, as illustrated in FIG. 10B, the robot 1 moves in a +Y-axis direction, and transports and disposes the component 42 to the component processing portion 72, by the moving mechanism 25.

Figure 10C:
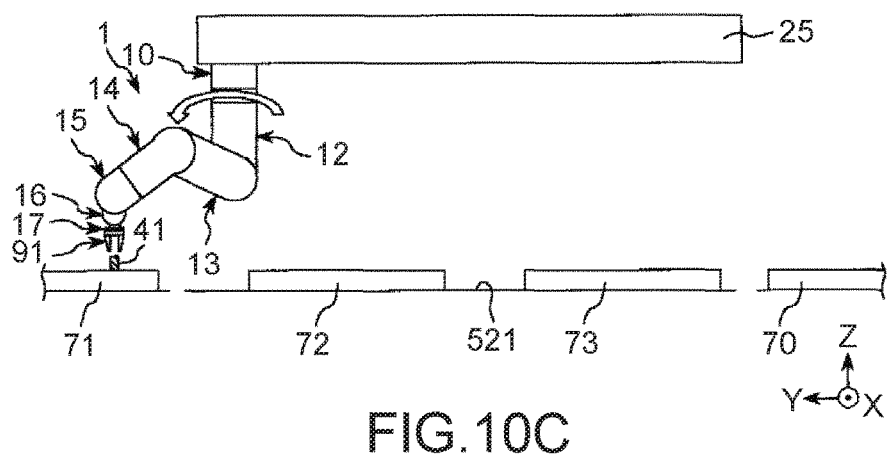

Next, as illustrated in FIG. 10C, the robot 1 does not rotate the first arm 12, and rotates the second arm 13 and the third arm 14, from a state where the second arm 13 is shifted from the first arm 12. Accordingly, the hand 91 is moved to a position different by 180° around the first rotating axis O1 via a state where the angle θ made by the first arm 12 and the second arm 13 becomes 0° when viewed from the axial direction of the second rotating axis O2. At this time, as illustrated in FIG. 12, the robot 1 performs an operation of moving the hand 91 as illustrated by an arrow 56a, without performing an operation of moving the hand 91 as illustrated by arrows 57a and 58a. In addition, at this time, as fine adjustment, an arbitrary arm among the first arm 12, the fifth arm 16, and the sixth arm 17 may be rotated. In this manner, the robot 1 moves the hand 91 onto the component supply portion 71 from the component processing portion 72. Next, the robot 1 grabs the component 41 disposed in the component supply portion 71 by the hand 91.

Figure 11A:
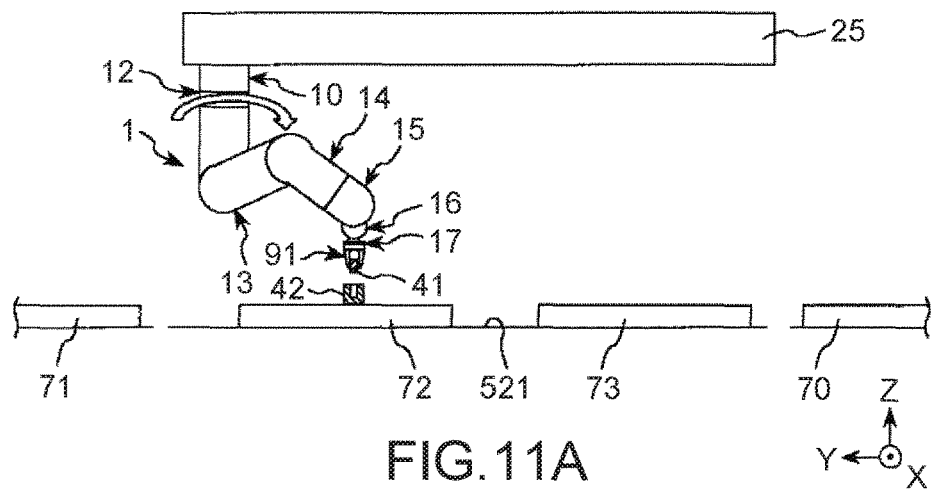
FIGS. 11A to 11C are views illustrating the operation of the robot in the manufacturing line illustrated in FIG. 9.
Figure 12:
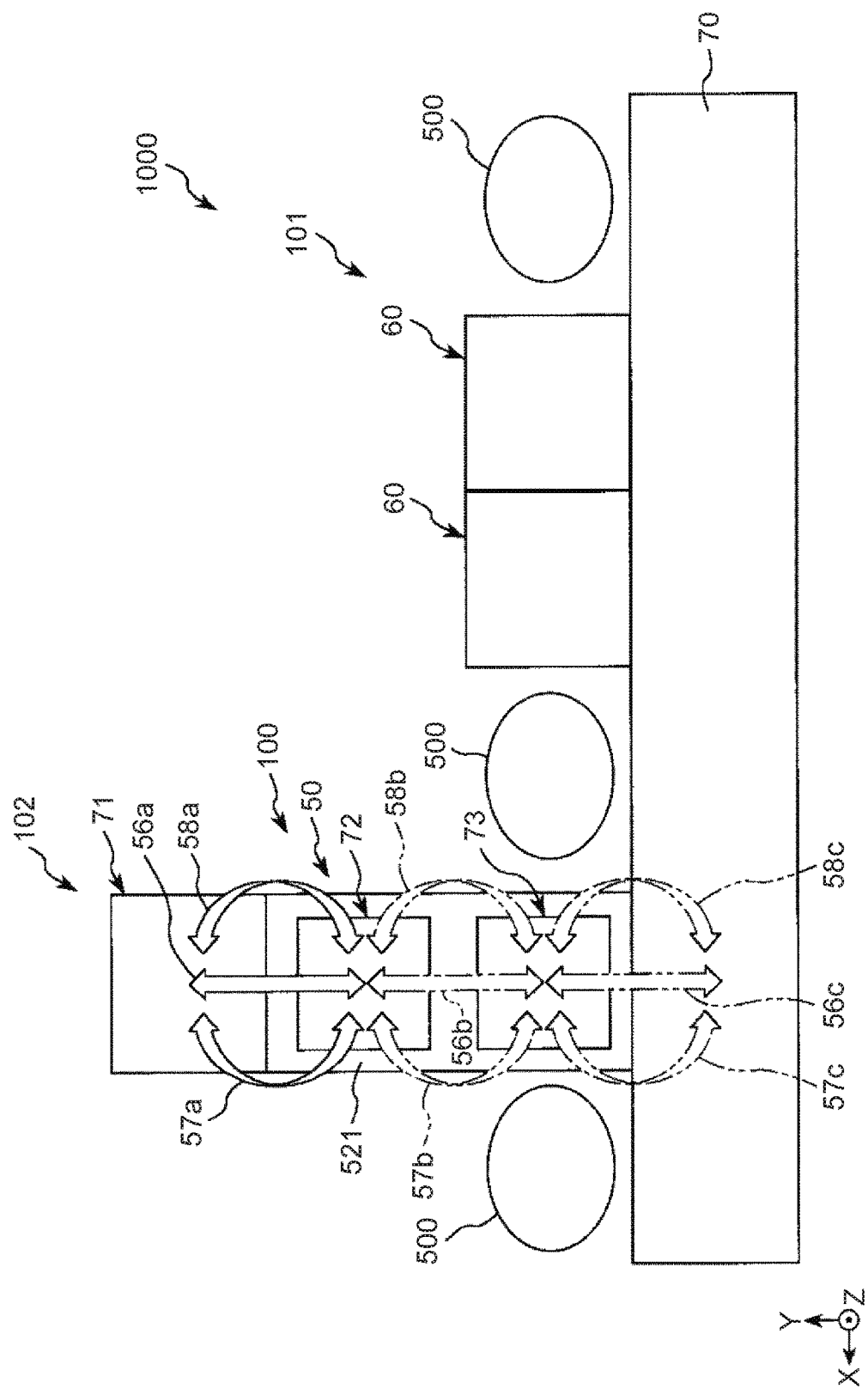
FIG. 12 is a view illustrating a moving path of the tip end portion of the robot arm in the manufacturing line illustrated in FIG. 9.

Next, as illustrated in FIG. 11A, the robot 1 does not rotate the first arm 12, and rotates the second arm 13 and the third arm 14, from a state where the second arm 13 is shifted from the first arm 12 while grabbing the component 41. Accordingly, the hand 91 is moved to a position different by 180° around the first rotating axis O1 via a state where the angle θ made by the first arm 12 and the second arm 13 becomes 0° when viewed from the axial direction of the second rotating axis O2. At this time, as illustrated in FIG. 12, the robot 1 performs an operation of moving the hand 91 as illustrated by the arrow 56a, without performing an operation of moving the hand 91 as illustrated by the arrows 57a and 58a. In addition, at this time, as fine adjustment, an arbitrary arm among the first arm 12, the fifth arm 16, and the sixth arm 17 may be rotated. In this manner, the robot 1 moves the hand 91 onto the component processing portion 72 from the component supply portion 71. Next, the robot 1 assembles the component 41 to the component 42 disposed on the component processing portion 72.

Figure 11B:
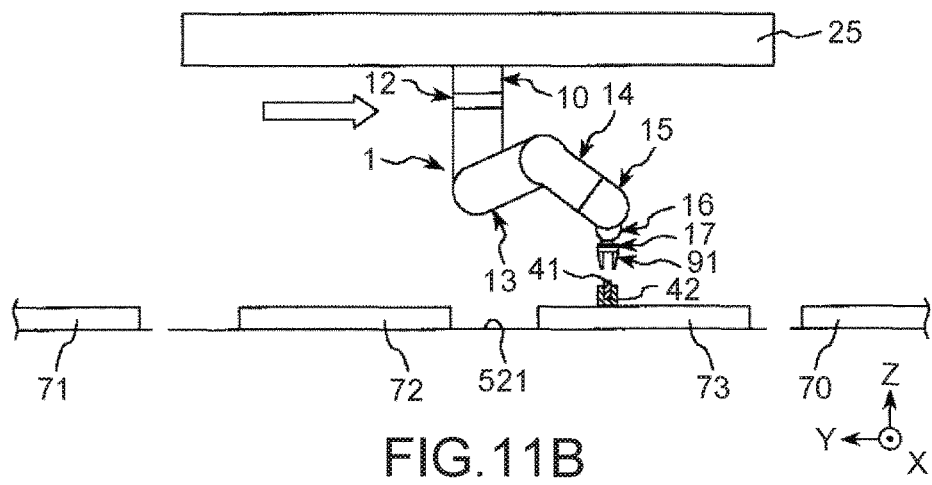

Next, the robot 1 grabs the component 42 to which the component 41 is assembled by the hand 91. Next, as illustrated in FIG. 11B, the robot 1 moves in an −Y-axis direction, and transports and disposes the component 42 to which the component 41 is assembled to the component inspecting portion 73, by the moving mechanism 25. In the component inspecting portion 73, for example, the inspection whether or not the component 41 is normally assembled to the component 42 is performed.

Figure 11C:
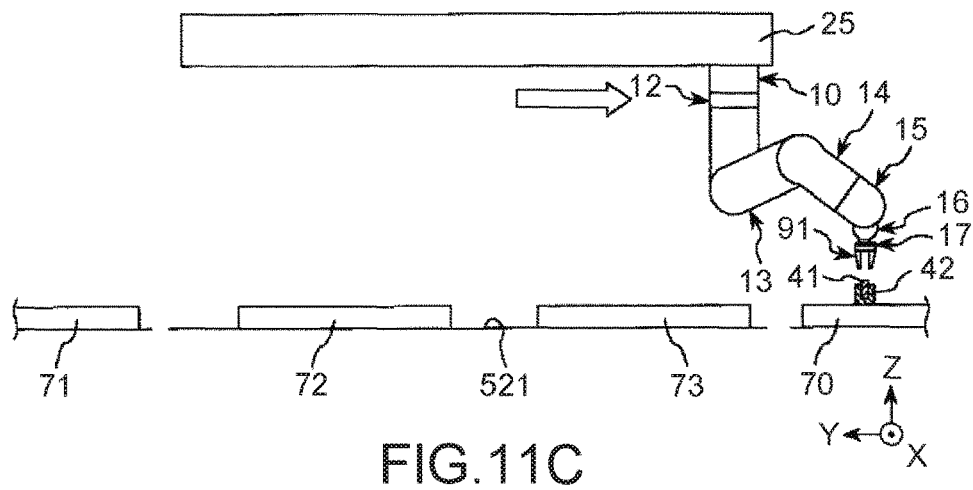

In addition, the robot 1 grabs the component 42 after the inspection. Next, as illustrated in FIG. 11C, the robot 1 moves in the −Y-axis direction by the moving mechanism 25, and transports and disposes the component 42 to the conveyor 70 of the main line 101.

In this manner, it is possible to perform various types of work of transporting, assembling (processing), and inspecting the components 41 and 42 by the robot 1. In addition, the robot 1 can repeat various types of work of transporting, assembling, and inspecting by repeating the above-described operation.

In the work, since the robot 1 can move in the longitudinal direction (Y-axis direction) of the cell 5, as described above, within a much wider range of the cell 5, it is possible to perform various types of work of transporting, assembling (processing), and inspecting. Furthermore, since the robot 1 can move in the longitudinal direction (Y-axis direction) of the cell 5, not being limited to the inside of the cell 5, it is also possible to perform the work outside the cell 5 (the component supply portion 71 and the conveyor 70).

In addition, as described above, the robot 1 can move the hand 91 to a position different by 180° around the first rotating axis O1 by moving the hand 91 as illustrated by the arrow 56a. For this reason, it is also possible to drive the robot arm 10 without interference of the cell 5 in the above-described width W2. For this reason, without a substantial change, such as a change of the entire manufacturing line 1000, by exchanging the human worker 500 and the robot cell 50, it is possible to simply configure the subline 102.

In addition, in the embodiment, between the component supply portion 71 and the component processing portion 72, the robot 1 moves the hand 91 to a position different by 180° around the first rotating axis O1 as described above. However, the robot 1 may move the hand 91 to a position different by 180° around the first rotating axis O1 as described above between the component processing portion 72 and the component inspecting portion 73, and between the component inspecting portion 73 and the conveyor 70. In other words, as illustrated in FIG. 12, the robot 1 may perform an operation of moving the hand 91 as illustrated by arrows 56b and 56c, without performing an operation of moving the hand 91 as illustrated by arrows 57b, 58b, 57c, and 58c.

In addition, as described above, in the embodiment, the width W2 is substantially a half of the width W1, but the width W2 is not limited thereto. In other words, W1/W2 which is a ratio of the width W1 and the width W2 is arbitrary. Therefore, the width W2 may be wider than the width W1. However, by making the width W2 narrower than the width W1, it is possible to easily exchange the human worker 500 and the robot cell 50 as described above, and to simply configure the subline 102 in which a larger amount of work can be performed.

In addition, in the robot 1 of the embodiment, the base 11 is attached to the moving mechanism 25 provided in the ceiling portion 513, and accordingly, the robot 1 is provided to be suspended from the ceiling portion 513. For this reason, it is possible to further widen the range where the work can be performed on the work surface 521 which is below the robot 1 in the vertical direction, and to perform a larger amount of work on the work surface 521.

Second Embodiment

Figure 13:
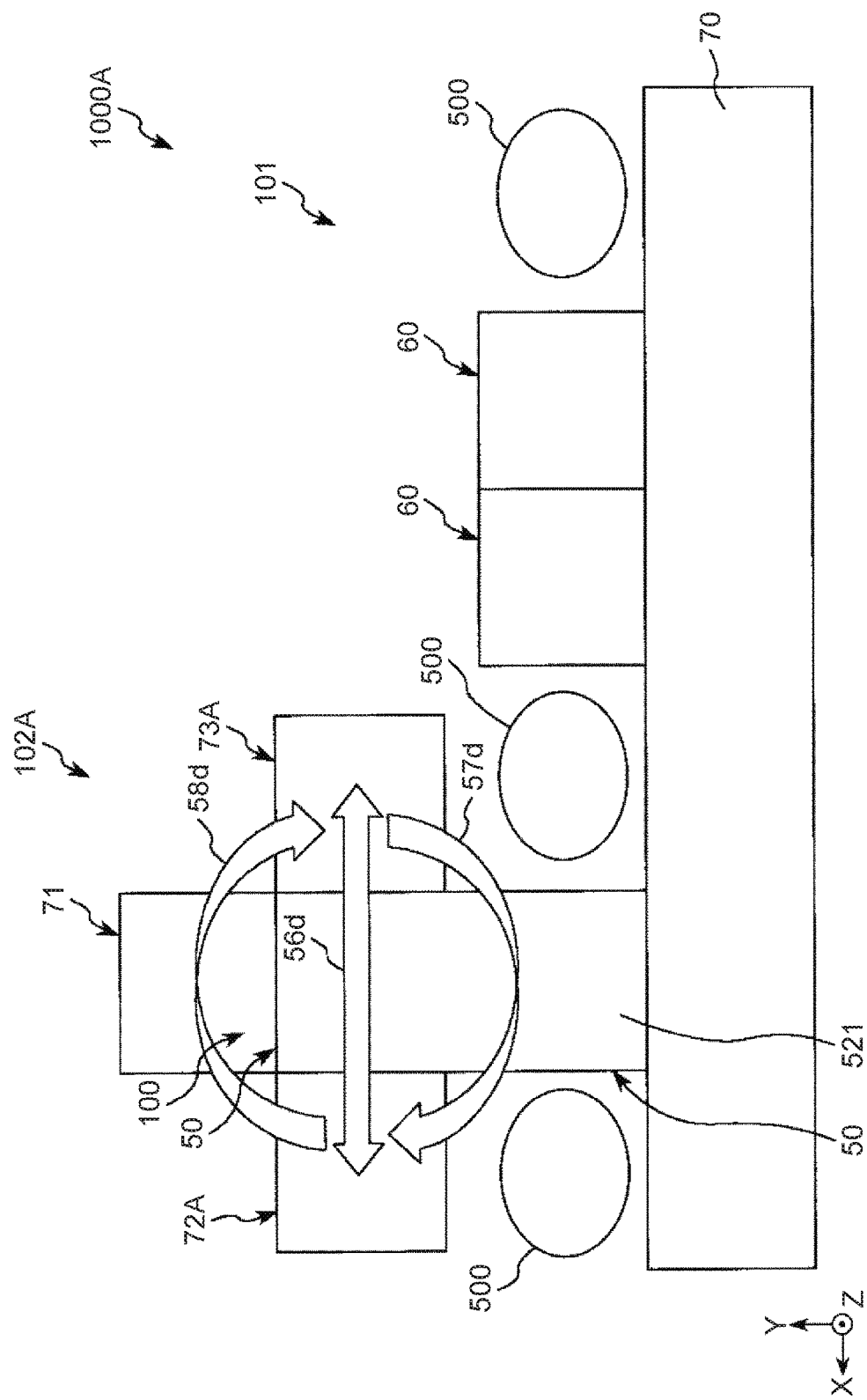
FIG. 13 is a view illustrating the moving path of the tip end portion of the robot arm in the manufacturing line which uses a second embodiment of the robot system according to the invention.

FIG. 13 is a front view illustrating the moving path of the tip end portion of the robot arm in the manufacturing line which uses a second embodiment of the robot system according to the invention.

Hereinafter, the second embodiment will be described with reference to the drawings, but the description will focus on differences from the above-described embodiment, and similar contents will be omitted from the description.

The manufacturing line which uses the robot system of the embodiment is similar to that of the above-described embodiment except the configuration of the subline.

In a subline 102A which uses the robot system 100 illustrated in FIG. 13, a component processing portion 72A and a component inspecting portion 73A are provided on both sides of the robot cell 50. In other words, the subline 102A includes the robot cell 50, the component supply portion 71 which is provided to be separated from the robot cell 50, the component processing portion 72A, and the component inspecting portion 73A.

As described in the embodiment, the robot 1 can perform an operation of moving the hand 91 to a position different by 180° around the first rotating axis O1 via a state where the angle θ made by the first arm 12 and the second arm 13 becomes 0° when viewed from the axial direction of the second rotating axis O2. For this reason, as illustrated in FIG. 13, in the subline 102A, the robot 1 can perform an operation of moving the hand 91 as illustrated by an arrow 56d without performing an operation of moving the hand 91 as illustrated by arrows 57d and 58d when moving the hand 91 between the component processing portion 72A and the component inspecting portion 73A while straddling the work surface 521. For this reason, it is possible to prevent interference of the robot 1 with the cell 5. In addition, since such movement is possible, a distance between the component processing portion 72A and the component inspecting portion 73A, and the human worker 500 positioned near the main line 101 may not be long. For this reason, it is possible to suppress the length (the length which is orthogonal to the transporting direction of the main line 101) in the Y-axis direction of the subline 102 not to be long, and accordingly, to suppress the size of a manufacturing line 1000A.

In addition, in the embodiment, the component supply portion 71, the component processing port ion 72A, the component inspecting portion 73A are disposed around the cell 5, but in addition to this, a work portion for performing the work of supplying, removing, transporting, assembling, disposing, and processing the component may be provided. In addition, the disposition and the number of the component supply portion 71, the component processing portion 72A, the component inspecting portion 73A, and other work portions are not limited to the disposition or the number illustrated in FIG. 13, and are arbitrary.

According to the second embodiment, it is also possible to achieve effects similar to those of the above-described first embodiment.

Third Embodiment

Figure 14:
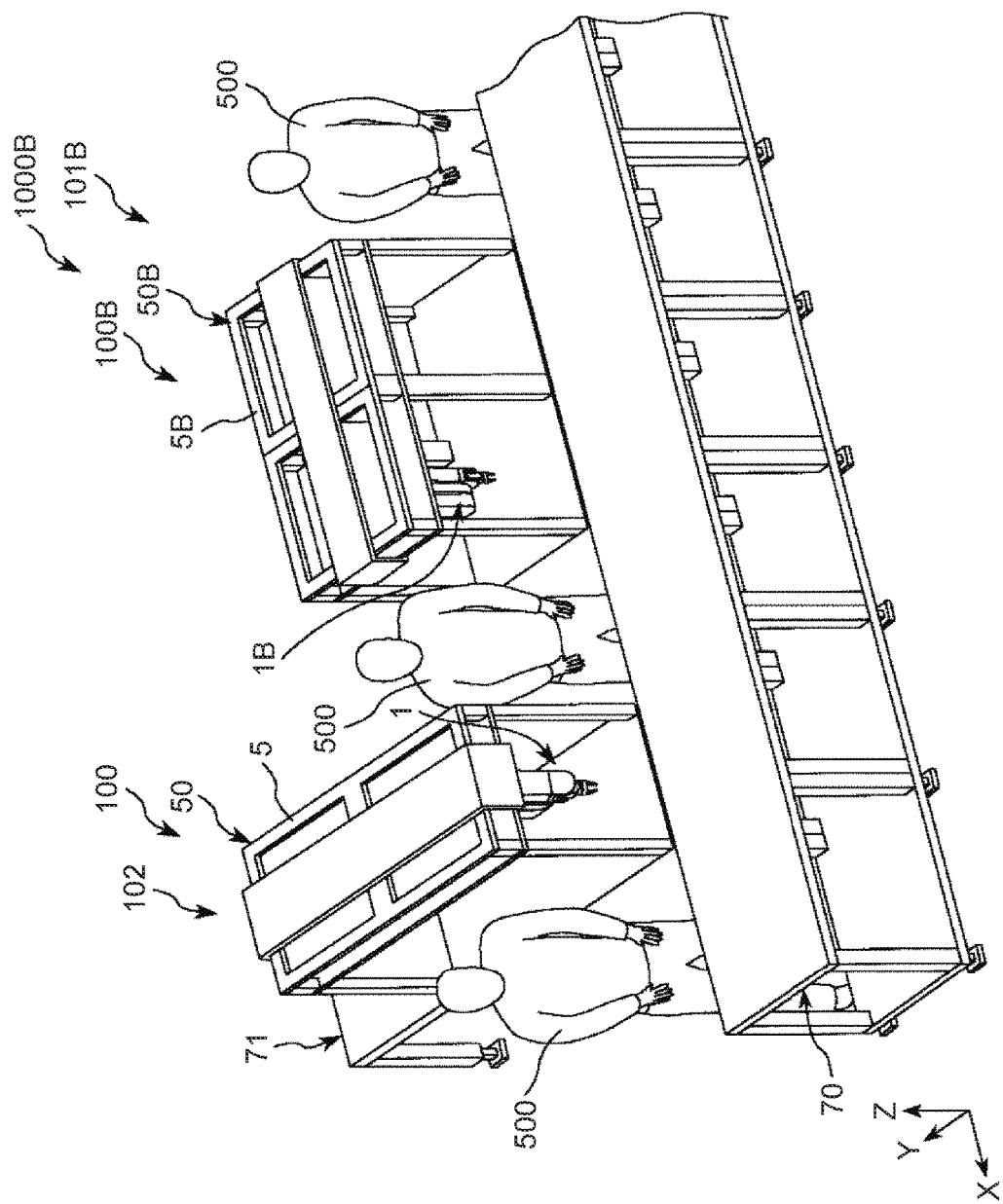
FIG. 14 is a view illustrating an example of the manufacturing line which uses a third embodiment of the robot system according to the invention.

FIG. 14 is a view illustrating an example of the manufacturing line which uses a third embodiment of the robot system according to the invention.

Hereinafter, the third embodiment will be described with reference to the drawings, but the description will only focus on differences from the above-described embodiment, and similar contents will be omitted from the description.

The manufacturing line which uses the robot system of the embodiment is similar to the above-described embodiments except that a robot cell (robot cell 50B) included in the robot system of the embodiment is provided instead of two robot cells (robot cell 60) included in the main line in the first embodiment.

The robot cell 50B included in a robot system 100B illustrated in FIG. 14 is provided so that the transporting direction (X-axis direction) of the component of a main line 101B and the longitudinal direction of a cell 5B are substantially parallel to each other. In addition, the robot system 100B is configured to be similar to the robot system 100 in the first embodiment, and includes the robot cell 50 having a robot 1B and the cell 5B.

As described in the first embodiment, since the robot 1B can move in the longitudinal direction of the cell 5B, it is possible to further widen the work range by the robot 1B. For this reason, by using the robot cell 50B, it is possible to perform work which is similar to a case where two robots are used by one robot 1B. In addition, as the work can be performed by one robot 1B, compared to a case where two robots are used, it is possible to easily control the robot 1B.

In addition, in the embodiment, one robot cell 50B is used instead of two robot cells 60, but one robot cell 50B may be used instead of one robot cell 60, and one robot cell 50B may be used instead of three or more robot cells 60. In this case, for example, W1/W2 which is a ratio of the width W1 and the width W2 of a robot cell 60B may be arbitrarily changed.

According to the third embodiment, it is also possible to achieve effects similar to those of the above-described first embodiment.

Above, the robot system according to the invention is described based on the embodiments illustrated in the drawings, but the invention is not limited thereto, and configurations of each portion can be switched to an arbitrary configuration having similar effects. In addition, another arbitrary configuration element may be added. In addition, the invention may be a combination of two or more arbitrary configurations (characteristics) among each of the above-described embodiments.

In addition, in the embodiments, the number of rotating axes of the robot arm included in the robot is six, but in the invention, the number is not limited thereto, and the number of the rotating axes of the robot arm may be two, three, four, five, seven or more. In addition, in the embodiment, the number of arms included in the robot is six, but in the invention, the number is not limited thereto, and the number of arms included in the robot may be two, three, four, five, seven or more.

In addition, in the embodiments, the number of robot arms included in the robot is one, but in the invention, the number is not limited thereto, and the number of robot arms included in the robot may be two or more. In other words, the robot may be a robot having a plurality of arms, such as a robot having two arms.

In addition, in the embodiments, an application example in which one robot is present in one cell is described, but the number of robots disposed in one cell is not limited thereto, and may be two or more.

In addition, in the above-described embodiments, an attachment location of the base of the robot at which the base of the robot is provided in the ceiling portion via the moving mechanism is not limited thereto. Examples of the attachment location may include a lower portion (an upper surface or a lower surface of the lower portion) or an upper portion (an upper surface or a lower surface of the upper portion) of the ceiling portion of the frame body, a columnar portion, and a work surface.

In addition, in the embodiments, with respect to the condition (relationship) of the n-th rotating axis, the n-th arm, the (n+1)th rotating axis, and the (n+1)th arm which are regulated within the range of the appended claims, a case where the condition is satisfied when n is 1, that is, in case of a first rotating axis, a first arm, a second rotating axis, and a second arm, is described. However, the invention is not limited thereto, and n may be an integer which is equal to or greater than 1, and in a case where n is an arbitrary integer which is equal to or greater than 1, the condition which is similar to the case where n is 1 may be satisfied. Therefore, for example, when n is 2, that is, in case of a second rotating axis, a second arm, a third rotating axis, and a third arm, the condition which is similar to the case where n is 1 may be satisfied. When n is 3, that is, in case of a third rotating axis, a third arm, a fourth rotating axis, and a fourth arm, the condition which is similar to the case where n is 1 may be satisfied. When n is 4, that is, incase of a fourth rotating axis, a fourth arm, a fifth rotating axis, and a fifth arm, the condition which is similar to the case where n is 1 may be satisfied. In addition, when n is 5, that is, in case of a fifth rotating axis, a fifth arm, a sixth rotating axis, and a sixth arm, the condition which is similar to the case where n is 1 may be satisfied.

In addition, in the embodiments, the manufacturing line is configured to include one main line and one subline, but the configuration of the manufacturing line is not limited thereto. For example, a plurality of sublines may be provided.

In addition, in the embodiments, the robot is configured to be movable in the longitudinal direction of the cell, but the moving direction of the robot is not limited thereto. For example, the robot may be movable in the lateral direction (direction which is orthogonal to the longitudinal direction) of the cell, and may be movable in other arbitrary directions. In addition, in the embodiment, the robot is configured to be movable in one direction, but the invention is not limited thereto, and the robot may be configured to be movable in plural directions.

What is claimed is:

1. A robot system comprising:
   a robot which includes a movable base and robot arm,
   wherein the robot arm includes a first arm, a second arm, a third arm, a fourth arm, a fifth arm, and a sixth arm,
   the first arm rotates around a first rotating axis,
   the second arm rotates around a second rotating axis which has an axial direction different from an axial direction of the first rotating axis, the second rotating axis being orthogonal to the first rotating axis when viewed from a direction orthogonal to both the first rotating axis and the second rotating axis,
   the third arm rotates around a third rotating axis, the third rotating axis being parallel to the second rotating axis,
   the fourth arm is connected to the third arm and rotates around a fourth rotating axis, the fourth rotating axis being orthogonal to the third rotating axis when viewed from a direction orthogonal to both the third rotating axis and the fourth rotating axis,
   the fifth arm is connected to the fourth arm and rotates around a fifth rotating axis, the fifth rotating axis being orthogonal to the fourth rotating axis when viewed from a direction orthogonal to both the fourth rotating axis and the fifth rotating axis,
   the sixth arm is connected to the fifth arm and rotates around a sixth rotating axis, the sixth rotating axis being orthogonal to the fifth rotating axis when viewed from a direction orthogonal to the fifth rotating axis and the sixth rotating axis,
   when viewed along the axial direction of the second rotating axis, the first arm, the second arm, and the third arm are configured to overlap each other in a folded state,
   the third arm is closer to the first rotating axis than the second arm when the first arm, the second arm, and the third arm are in the folded state, and
   the first arm includes a first leg extending parallel to the second rotating axis and a second leg extending parallel to the first rotating axis, a position of the first leg relative to the second leg is fixed and the first leg and the second leg, together, rotate about the first rotating axis.

2. The robot system according to claim 1, further comprising:
   a cell housing the robot and having a length in a first direction and a width in a second direction, the width in the second direction being orthogonal to the first direction and narrower than the length of the cell in the first direction, wherein the robot moves within the cell in the first direction with respect to the cell.

3. The robot system according to claim 2, wherein the width of the cell in the second direction is less than 750 mm.

4. The robot system according to claim 2, wherein the width of the cell in the second direction is less than 650 mm.

5. The robot system according to claim 1, further comprising:

a cell housing the robot, wherein the robot is configured to move in the cell, the movable base is disposed in the cell, and the first arm is provided on the movable base.

6. The robot system according to claim 5, wherein the robot further includes a first connection part between the movable base and the first arm and a second connection part between the first arm and the second arm, the first connection part being positioned above the second connection part in a vertical direction.

7. The robot system according to claim 5, wherein the cell includes a ceiling, and the movable base is provided in the ceiling.

8. The robot system according to claim 1, wherein the third rotating axis extends in an axial direction parallel to an axial direction of the second rotating axis.

9. The robot system according to claim 1, wherein the second arm is spaced apart from the second leg of the first arm.

* * * * *